ELECTROSTATIC INFORMATION-STORAGE SYSTEMS
Filed Dec. 6, 1954
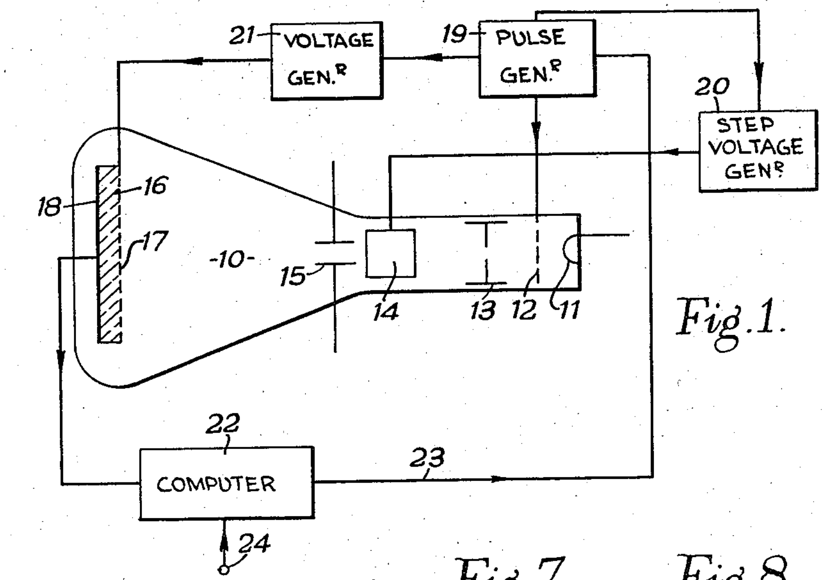
Fig.1.
Fig.2.
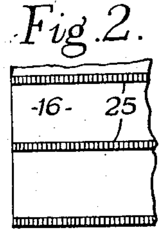
Fig.3.
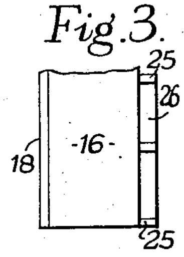
Fig.7.
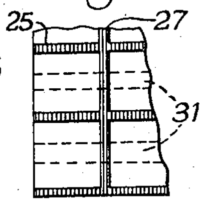
Fig.8.
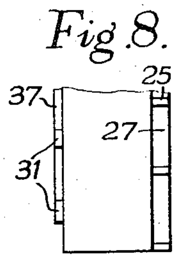
Fig.4.
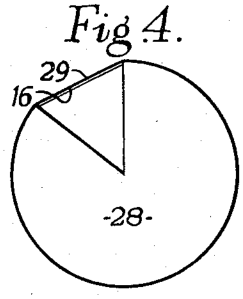
Fig.5.
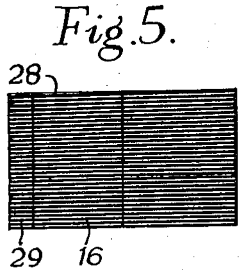
Fig.6.
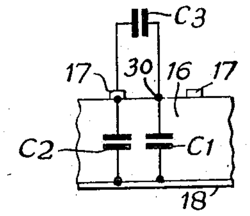
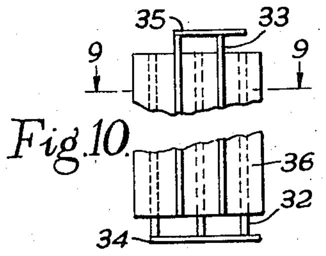
Fig.9.
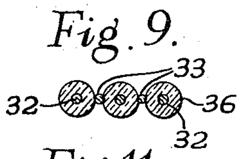
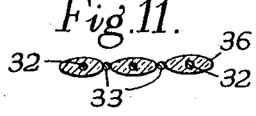
INVENTORS
F. C. WILLIAMS
TOM KILBURN
G. R. HOFFMAN
BY
Stevens, Davis, Miller & Mosher
ATTORNEYS 2,888,586

ELECTROSTATIC INFORMATION-STORAGE SYSTEMS

Frederic Calland Williams, Romiley, and Tom Kilburn and George Richard Hoffman, Manchester, England, assignors to National Research Development Corporation, London, England Application December 6, 1954, Serial No. 473,359

Claims priority, application Great Britain December 11, 1953

11 Claims. (Cl. 313—68)

The present invention relates to electrostatic information-storage systems of the kind in which the information is stored in the form of different values of charge on elemental areas of a charge-retaining storage member, in which the charge is produced on an elemental area, by bombardment thereof by a cathode ray beam, and the value of the charge is determined by the potential of an electron-permeable electrode disposed on the bombarded side of the storage member.

An example of a storage system of this kind is set forth in the specification of our patent application Serial No. 473,360, filed on the same date as the present application.

The principle upon which the operation of such systems depends is as follows. When an elemental area is bombarded by the cathode ray beam, with the said electrode (hereinafter referred to as the mesh) held at a positive potential relatively to the average potential of the storage surface, secondary electrons are emitted by the elemental area and collected by the mesh until the potential of the area has reached a value close to that of the mesh. Thereafter no further change in the potential of the area occurs during further bombardment so long as the potential of the mesh remains constant. If the potential of the mesh is then made more negative, bombardment of the area causes the area to collect electrons from the beam, thereby changing the potential of the area until it reaches a value near to that of the mesh when its potential is stabilised by secondary emission as previously described. In order to enable the stored information to be read, a pick-up electrode is capacitively coupled to the storage surface and changes in charge on the storage surface produce voltage changes in the pick-up electrode.

For the sake of economy of space it is important that the adjacent elemental areas should be arranged as close together as possible provided that the charge and changes in the charge on one elemental area do not substantially affect the charges on adjacent elemental areas.

A further requirement is that the mesh should be close to the storage surface in order that it may exert the maximum control of the potential assumed by the elemental areas. Disposing the mesh close to the storage surface also has the advantage that it then acts as an effective electrostatic screen in reducing mutual interference between the electrostatic fields associated with the charges on the elemental areas and thus enables the spacing of adjacent elemental areas to be closer than would otherwise be possible.

It has, however, been realised that mutual interaction between the charges on adjacent elemental areas can take place not only by electrostatic coupling but also by leakage of charge over the storage surface. Further it has been found that there is no disadvantage from the point of view of efficiency of operation in arranging the mesh in contact with the storage surface, while such an arrangement of the mesh allows the mesh to act not only as an electrostatic screen but also as a screen to prevent surface leakage from one elemental area to another.

According to the present invention, therefore, a charge-retaining storage member adapted for use in an electrostatic information-storage system of the kind specified comprises areas of insulating material adapted to be charged by a cathode ray beam and separated by conducting zones, the conducting zones being constituted by conducting members electrically connected together to form a mesh and in contact with the said areas of insulating material, and a pick-up electrode capacitively-coupled to the said areas of insulating material and insulated from the mesh.

The invention will be described by way of example with reference to the accompanying drawing in which Fig. 1 is a block circuit diagram of a storage system in which a storage member according to the invention may be used, Figs. 2 and 3 are views in front and side elevation respectively, much enlarged, of a part of a storage member or screen according to the invention, Figs. 4 and 5 are views in end elevation and plan respectively of a former that may be used in making a screen as shown in Figs. 2 and 3, Fig. 6 is an explanatory diagram showing relevant capacitances, Figs. 7 and 8 are views corresponding to those of Figs. 2 and 3 showing a modified form of srceen according to the invention, Figs. 9 and 10 are views in sectional plan and side elevation, respectively, much enlarged, of part of a further screen according to the invention, the section in Fig. 9 being along the line 9—9 in Fig. 10, and Fig. 11 is a sectional plan view of a modification of the screen in Figs. 9 and 10.

Referring to Fig. 1, a cathode ray tube 10 has a cathode 11, beam-intensity control grid 12, a focusing system represented by 13, deflecting plates 14 and 15 and a screen, shown much enlarged in thickness, comprising an insulating member 16, for example of mica, a mesh 17 and a signal pick-up electrode 18.

The operation of such a system is more fully described in the specification of the co-pending application already referred to. In the example of Fig. 1 there is provided a pulse generator 19 adapted to generate two trains of recurrent pulses the pulses of one train occurring during the first part of a digit interval and the pulses of the other train occurring during a later part of the digit interval. The pulses of the first set are applied continuously to the control grid 12 to switch the cathode ray beam on during the first part of each digit interval.

Pulses from the generator 19 are applied to a stepped saw-tooth voltage generator 20 and synchronise this generator in such a manner that a step of constant voltage occurs throughout each digit interval. This stepped voltage is applied to the deflecting plate 14 and causes the cathode ray beam to be directed successively upon a row of digit storage areas on the screen 16, remaining stationary on each area for the duration of a digit interval. A suitable sawtooth voltage applied in well-known manner to the deflecting plates 15 causes the beam to scan a raster on the screen.

A voltage generator 21 is also synchronized by pulses from the generator 19 and generates two different voltages, one during the first part of each digit interval and one during the later part of the digit interval.

When only pulses of the first train are applied to switch the beam on, only the voltage from 21 occurring during the first part of each digit interval, say voltage 1, is applied to the mesh 17 during bombardment of the screen 16 and the bombarded elemental area of the screen therefore assumes a value close to voltage 1. This represents one digit, say "0." In order to store another digit, say "1," after a bombardment as described during the first part of a digit interval a pulse of the second train from 19 is applied to the grid 12 to switch the beam on again, and this time the second voltage 2 is upon the mesh 17. The bombarded elemental area therefore assumes a potential near to 2.

Reading takes place during the first part of each digit interval. When the beam bombards during the first part of a digit interval (and therefore with voltage 1 on the mesh) an area that was previously bombarded only during the first part of a digit interval, that is an area charge to represent "0," substantially no change of voltage takes place and the signal pick-up plate 18 therefore receives substantially no signal. When the area bombarded during the first part of a digit interval has a charge corresponding to "1," however, its potential is changed from a value near voltage 2 to a value near voltage 1, and hence a substantial signal appears on the signal plate 18.

The signals from the signal plate may be applied to a computer 22 having means for selecting from the signals from the signal plate only those occurring during the first part of each digit interval, and, according to requirements, there is transmitted along a connection 23 to the pulse generator 19 a signal which prevents or permits the application of a pulse of the second train to the grid 12. New information to be written-in may be applied to the computer at a terminal 24.

As shown in Figs. 2 and 3, the mesh 17 may be constituted by a number of parallel conducting strips 25 connected together at one end by a conductor 26, or, as shown in Figs. 7 and 8 by two mutually perpendicular sets of parallel conducting strips 25 and 27, the strips of each set being connected together at one end. In the case of two mutually perpendicular sets, a woven mesh is preferably not employed since it is then difficult to arrange that the conductors are in contact with the insulating material 16 over their whole length as is necessary in order to provide the maximum screening against surface leakage.

When, as shown in Figs. 2, 3, 7 and 8, a continuous insulating surface is used, and the aforesaid areas of insulating material are produced by subdivision of the continuous surface by the mesh, the mesh conductors may be applied to the surface by evaporation of a suitable metal, such as silver, through a mask. Alternatively a photographic process such as is used in producing what are known as "printed circuits" may be used.

The mesh conductors 25 or 25 and 27 should be as narrow as possible, consistent with their having a sufficiently low resistance, in order that as much of the surface of the storage member as possible should be available for the storage of charge. The conductors can, therefore, as shown, advantageously be made thick (in a direction normal to the storage surface) in comparison with their width.

One way in which a mesh may be applied to an insulator, such as a sheet of mica, by evaporation is as follows: A cylindrical former 28 as shown in Figs. 4 and 5 has a screw thread cut in its surface and has cut therefrom a sector large enough to accommodate a sheet 16 of mica of the desired size. A wire 29 is wound around the former in the screw thread. The mica sheet is supported behind and in contact with the wires which extend across the gap left by the sector removed. The wires act as a mask when the mica is exposed to the vapour of silver.

In one example mica 0.01 inch thick is used, the wires 29 are 0.01 inch in diameter and are separated by 0.001 inch. This gives a mesh of conductors about 0.001 inch wide separated by about 0.01 inch. Such a spacing is suitable for use where the diameter of the spot produced by the cathode ray beam is about 0.03 inch.

Care must be taken when sealing storage members such as have been described into their envelopes and when baking the envelopes to avoid globulation of the silver, or other metal, which would result in a breakage in conductivity.

The pick-up electrode 18 as shown in Figs. 2 and 3 may be constituted by a conductive coating on the side of the mica opposite to that bombarded by the cathode ray beam. However the thickness of the mica, or other insulator, the nature of the pick-up electrode and other dimensions should be carefully chosen having regard to the following considerations. Referring to Fig. 6, the capacity between a storage area 30 and the pick-up electrode 18 is represented by $C_1$, that between the mesh 17 and the pick-up electrode 18 by $C_2$ and that between the storage area and the mesh by $C_3$. When a voltage is applied to the mesh 17 the potential produced at the storage area 30 depends on the ratio of the three capacities mentioned. The capacity $C_3$ requires to be as low as possible so that when the storage area is bombarded with electrons the change of potential induced by the primary and secondary electrons is as great as possible. For a maximum pick-up of signals on the pick-up electrode, $C_1$ should be as large as possible. If $C_1$ is too large, however, the change of potential on the storage area is undesirably small.

It is desirable that this change of potential should be greater than 3 or 4 volts so that it is larger than the velocity of emission of the secondary electrons from the screen and, consequently, a greater difference is provided between the different charge conditions representative of different items of information than is provided with storage systems not employing a mesh.

The capacity $C_2$ is limited by compromise with the other requirements and by the fact that the large the value of $C_2$ the more difficult it is to filter out and reject the unwanted R.F. signals generated in the pick-up electrode when R.F. oscillations are applied to the pick-up electrode and control grid as described in the preferred embodiment of the specification of the co-pending application previously referred to.

It has been found that when a continuous conducting layer is used as pick-up electrode the capacity $C_1$ usually tends to be too great. Moreover it is to be noted that when an insulating area between two bars of the mesh is charged, the charge is a maximum at the centre of the area and decreases to zero at the bars. Thus the parts of the pick-up plate immediately opposite the bars of the mesh are of substantially no value in developing a signal from changes in the charge.

According to a feature of the invention, therefore, the pick-up electrode is discontinuous and comprises a number of conductors connected together, spaces between adjacent ones of these conductors being disposed opposite to conductors of the mesh. When the mesh is in the form of two mutually perpendicular sets of parallel conducting bars 25 and 27 as shown in Figs. 7 and 8, the pick-up electrode may consist of a set of parallel conducting bars 31 disposed upon the opposite side of the insulating member to the mesh and arranged opposite the spaces between one set of bars of the mesh and connected together at one end by a conductor 37. The bars of the pick-up electrode may, for example, have a width equal to about half the space between the bars of the mesh; in the above-cited example the width would therefore be about 0.005 inch. The same form of pick-up electrode may be used when the mesh consists of only one set of parallel bars, that is when the bars 27 in Figs. 7 and 8 are omitted.

It is not necessary that the storage member should have a continuous insulating surface. For example in another form of storage member according to the invention shown in Figs. 9 and 10, the member is formed of insulated and uninsulated wires 32 and 33 respectively disposed in a plane parallel to and in contact with one another, the insulated and uninsulated wires being disposed alternately.

The insulated wires 32 are all connected together at one end by a conductor 34 and the uninsulated wires 33 are all connected together at one end by a conductor 35. In this case the insulation 36 of the insulated wire provides the areas of insulating material on which storage takes place. The wires 32 within the insulation constitute the pick-up electrode and the uninsulated wires 33 constitute the mesh. The insulation may for example be glass or a plastic or A1203 (aluminium oxide).

A storage member of this kind may be constructed by winding the two wires side-by-side upon a suitable former, soldering or spot welding the insulated wires along a line which is to form one boundary of the storage member to a conducting bar, soldering or spot welding the uninsulated wires along another line which is to constitute the opposite boundary of the storage member to another conducting strip, and then cutting the wires outside the two strips. Care must of course be taken that the insulated and uninsulated wires remain insulated from one another.

When the insulating material is a thermo-plastic material, the storage member constructed as described may be heated and subjected to pressure in order to flatten the surface which is exposed to bombardment and also to consolidate the structure. This is indicated in Fig. 11.

Although reference has been made hitherto to meshes of straight conductors, it is not necessary that these conductors should be straight. For example when using storage members made up of insulated and uninsulated wires, the two wires may be wound side-by-side in the form of a spiral.

We claim:

1. An electrostatic charge-storing screen for a cathode ray tube comprising insulating means having surface portions of which are to receive electron bombardment, a large plurality of spaced elongated conducting members electrically connected together and in contact with said surface between said portions, and a pick-up electrode capacitively coupled to said surface portions and insulated from said conducting members, said pick-up electrode comprising spaced elongated conducting elements disposed substantially parallel to said conducting members, electrically connected together and offset in a direction parallel to said surface relatively to said conducting members.

2. A storage screen according to claim 1, wherein said surface is continuous.

3. A storage screen according to claim 1, wherein said insulating means is an insulating sheet, and wherein said pick-up electrode is mounted upon the opposite side of said sheet to the said surface.

4. A storage screen according to claim 3, wherein said conducting members are spaced apart by distances substantially greater than the widths of said members parallel to said surface.

5. A storage screen according to claim 3, wherein said conducting members have a thickness perpendicular to said surface greater than their width parallel to said surface.

6. A storage screen according to claim 3 wherein said conducting members comprise a further set of conducting members at right angles to the first-mentioned conducting members, all said members being in contact with said surface throughout their lengths.

7. A storage screen according to claim 1 wherein said insulating means surrounds said conducting elements.

8. A storage screen according to claim 1, wherein the widths of the conducting elements of said pick-up electrode, in a direction parallel to said surface, are substantially less than the widths of said spaces.

9. A storage screen according to claim 1, wherein each of said conducting elements is surrounded by an insulating covering constituting said insulating means, and wherein said conducting members are constituted by non-insulated conductors between and in contact with said insulating coverings.

10. A storage screen according to claim 7, wherein the thickness of said insulating means in the plane of said conducting elements is substantially greater than the thickness of said insulating means normal to said plane.

11. An electrostatic charge-storing screen for a cathode ray tube comprising insulating means having a large plurality of charge storage areas separated by other areas, elongated conducting members in contact with said insulating means in said other areas, means electrically connecting said conducting members, and a pick-up electrode, said pick-up electrode comprising spaced elongated conducting elements electrically connected together and in register with said storage areas insulated therefrom by said insulating means.

References Cited in the file of this patent

UNITED STATES PATENTS

| | | |
|---|---|---|
| 2,481,458 | Wertz | Sept. 6, 1949 |
| 2,618,762 | Snyder | Nov. 18, 1952 |
| 2,675,499 | Sears | Apr. 13, 1954 |